Patented Nov. 28, 1933

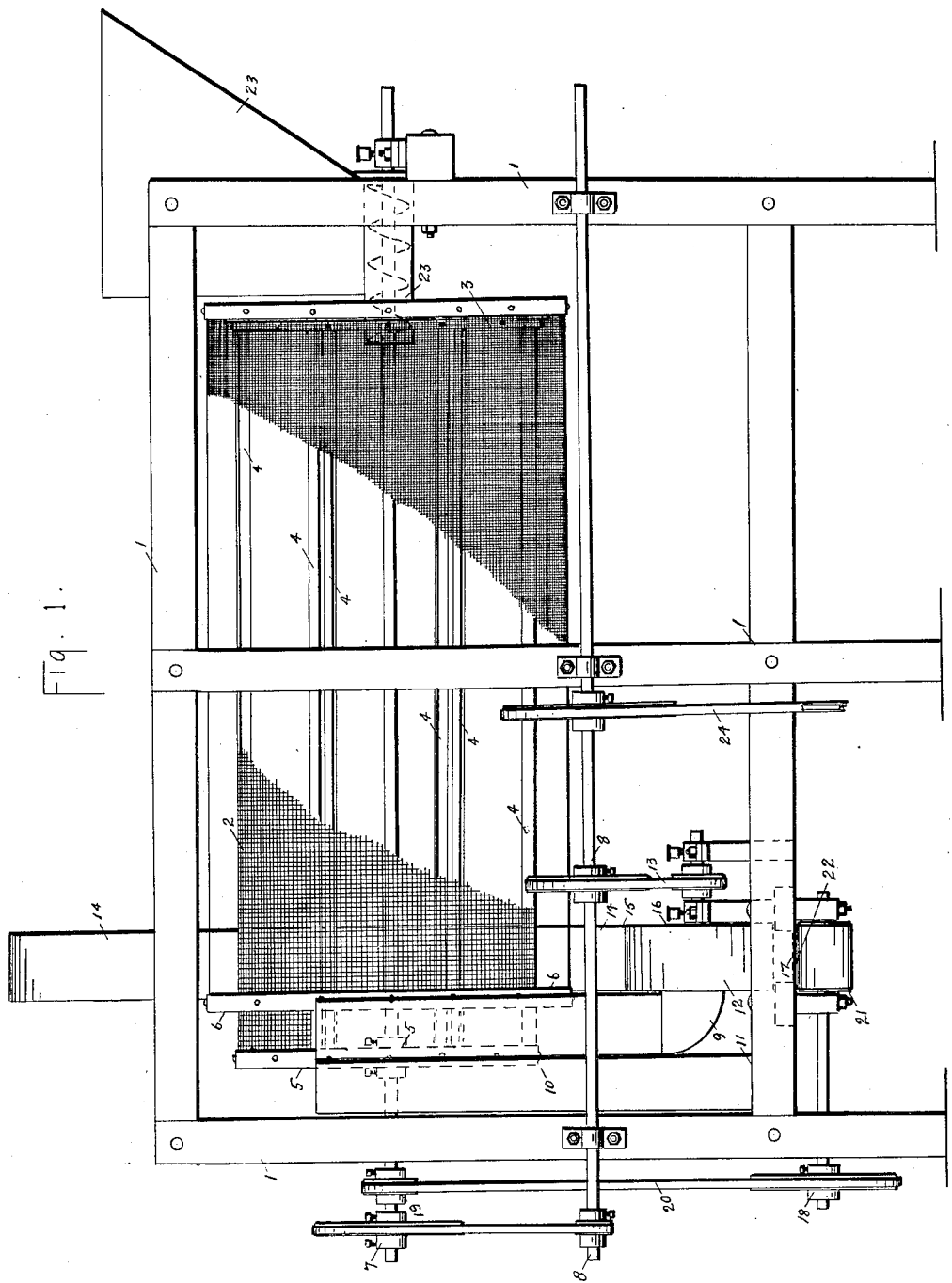

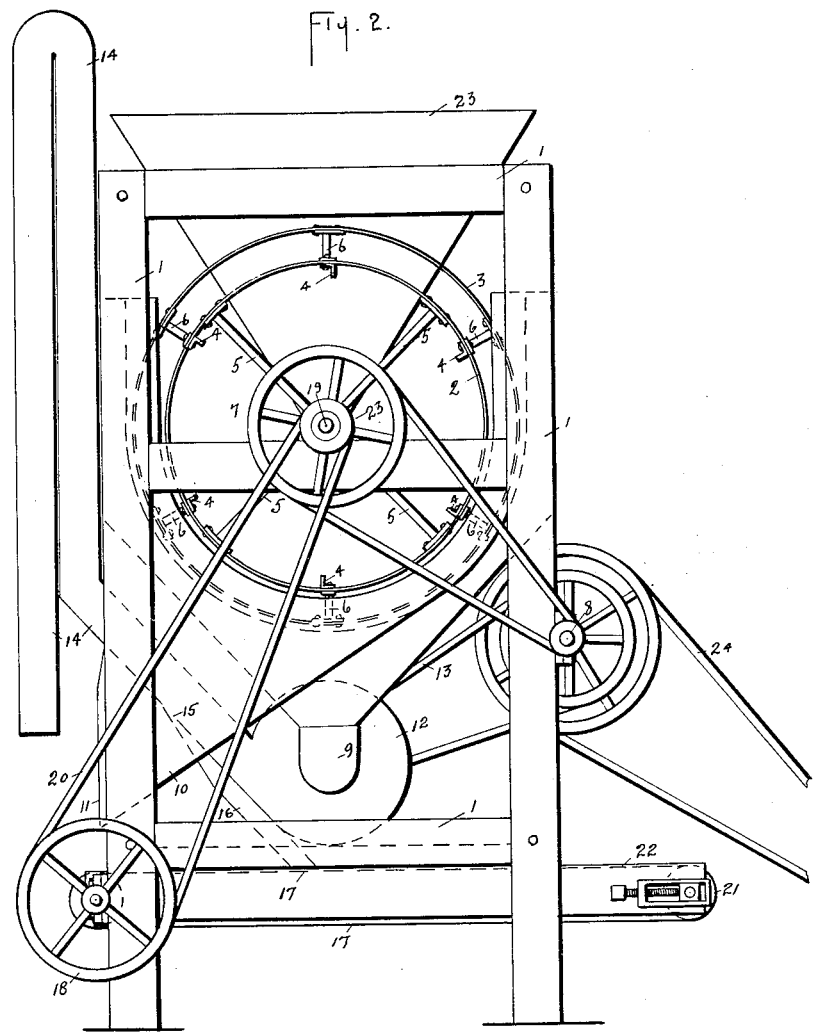

1,937,315

UNITED STATES PATENT OFFICE 1,937,315

MACHINE FOR THE PURPOSE OF DETECTING PINK BOLL WORM INFESTATION IN GIN TRASH

Robert E. McDonald and Gustav J. Scholl, San Antonio, Tex., dedicated to the Government and the people of the United States of America Application June 2, 1930. Serial No. 458,989

1 Claim. (Cl. 209—12)

(Granted under the act of March 3, 1883, as amended April 30, 1928; 370 O. G. 757)

This application is made under the act approved April 30, 1928, and the invention herein described, if patented, may be manufactured and used by or for the Government for governmental purposes without the payment to us of any royalty thereon.

We hereby dedicate the invention herein described to the free use of the public, to take effect upon the granting of a patent to us.

Heretofore in the examination of gin trash to determine whether infestation of the pink boll worm exists in the community under consideration the inspector was obliged to carefully look through the entire mass. With the use of our machine hereinafter described the mass to be examined contains all the pink boll worms and is a very small part of the quantity of material introduced. The amount of residue depends upon the quantity of material introduced in the beginning, but the general average will be about $\frac{1}{32}$ of the original volume; therefore, one man with our apparatus can do the work of 32 men without it; but on account of the clean condition of the material to be examined, the efficiency of the man is increased more than thirty-two fold.

Our invention relates to a machine which consists essentially of two drums, one within the other, both made of screen wire and made together so that they revolve in unison on one axis.

We attain the objects of our invention by the mechanism illustrated in the accompanying drawings in which: Figure 1 is a side view of the apparatus; and, Figure 2 is an end view.

Similar numerals refer to similar parts throughout the views.

The method of operation is that the material to be examined is dumped into hopper 23 attached to frame 1 by suitable means (not shown), picked up from the bottom by flanges 4, carried toward the top, dropped through funnel shaped chute into inner drum 2 by means of a screw conveyor attached to axis 19 by suitable means (not shown). The two drums 2 3 are attached at a slight angle to rods 5 affixed by suitable means (not shown) to axis 19. These drums revolve in unison. Inner drum 2 is made of screen six meshes to one inch and outer drum 3 is made of screen fourteen meshes to one inch.

Inner drum 2 is for the purpose of withholding those substances larger than is desired to recover, thus discharging them through primary discharge chute 10 having an aperture 11 outside of frame 1.

Outer drum 3 is for the purpose of passing through substances smaller than is desired to be recovered, thus the substances desired to be recovered, namely, the pink boll worm, will be held between inner drum 2 and outer drum 3, and discharged through secondary discharge chute 9 and forced by means of a blower fan 12 through an exhaust conduit 14 mounted within said frame 1; said exhaust conduit 14 having an aperture 15 to permit the heavier material to drop through said aperture into tertiary chute 16 and thence is conveyed by continuous belt 17, attached to pulleys 18 21. In this process those substances which are about the same size or smaller than the pink boll worm, pass through the meshes of inner drum 2 and as the machinery revolves by means of power (not shown), transmitted over continuous belt 24 to countershaft 8 by means of pulley 7, those substances pass through outer drum 3 through secondary discharge chute 9 out exhaust conduit 14 by air currents developed by blower 12. The purpose then of blower 12 is to give the substances a further cleaning, so that the insects may be discovered with less difficulty. Pink boll worms, which are desired to be recovered, and other substances of equal size and weight discharged from between the two drums are carried into blower 12, driven by continuous belt 13, which lifts by air current those substances which are lighter than the worm and other substances of equal weight and size, and discharges them through aperture 15 in exhaust conduit 14 into tertiary chute 16 and thence carried on continuous belt 17, which passes at 22 under the eyes of the inspector, enabling him thus to extract the insects.

We claim:

A gin trash separator comprising a frame, a charging chute mounted in said frame, an intake conveyor associated with said chute, means for imparting movement to said conveyor, dual concentric hollow screening drums mounted in said frame and having said intake conveyor internally disposed towards said innermost drum, means for angularly mounting said drums, an axis rod affixed to said frame and provided with means for imparting rotation to said drums, primary and secondary discharge chutes mounted in said frame, and having the innermost screening drum internally disposed towards said primary chute, and the outermost screening drum internally disposed towards said secondary discharge chute, a blower fan located within said frame with its intake adjacent said secondary discharge chute, an exhaust conduit mounted in said frame and connected to the periphery of said fan, a tertiary chute associated with said conduit, and a continuous discharge conveyor mounted in said frame and associated with said tertiary chute.

ROBERT E. McDONALD.
GUSTAV J. SCHOLL.